United States Patent
Lewis et al.

(10) Patent No.: US 12,481,743 B1
(45) Date of Patent: Nov. 25, 2025

(54) SYSTEM OF AND METHOD FOR VISUAL BRAIN BASED AUTHENTICATION

(71) Applicant: University of South Florida, Tampa, FL (US)

(72) Inventors: Tyree L. Lewis, Tampa, FL (US); Marvin Andujar, Tampa, FL (US)

(73) Assignee: University of South Florida, Tampa, FL (US)

( * ) Notice: Subject to any disclaimer, the term of this patent is extended or adjusted under 35 U.S.C. 154(b) by 66 days.

(21) Appl. No.: 18/608,374

(22) Filed: Mar. 18, 2024

Related U.S. Application Data

(60) Provisional application No. 63/490,716, filed on Mar. 16, 2023.

(51) Int. Cl.
  *G06F 21/32* (2013.01)
  *G06F 3/01* (2006.01)

(52) U.S. Cl.
  CPC .............. *G06F 21/32* (2013.01); *G06F 3/015* (2013.01)

(58) Field of Classification Search
  CPC ................................. G06F 21/32; G06F 3/015
  See application file for complete search history.

(56) References Cited

U.S. PATENT DOCUMENTS

| | | | |
|---|---|---|---|
| 9,389,685 B1* | 7/2016 | Pathirage | G06F 3/04842 |
| 10,588,561 B1* | 3/2020 | Vale | A61B 5/0042 |
| 10,849,526 B1* | 12/2020 | Demir | A61B 5/725 |
| 11,494,474 B2* | 11/2022 | Phillips | G06V 40/10 |
| 2014/0020089 A1* | 1/2014 | Perini, II | G07C 9/37 726/19 |
| 2014/0330123 A1* | 11/2014 | Manwaring | A61B 8/4444 600/443 |
| 2014/0333529 A1* | 11/2014 | Kim | G06F 3/015 345/156 |
| 2018/0053049 A1* | 2/2018 | Min | G06F 18/2411 |
| 2019/0294243 A1* | 9/2019 | Laszlo | G06N 20/00 |
| 2019/0320974 A1* | 10/2019 | Alzamzmi | A61B 5/746 |
| 2020/0151308 A1* | 5/2020 | Phillips | G06Q 20/40145 |

(Continued)

OTHER PUBLICATIONS

Abouelmehdi, K. et al. Big healthcare data: preserving security and privacy. J Big Data. 2018, 5:1.

(Continued)

*Primary Examiner* — J. Brant Murphy
(74) *Attorney, Agent, or Firm* — Molly L. Sauter; Trenam Law

(57) ABSTRACT

Described herein relates to a system of and method for automatically authenticating an identity of a user, via a brain-computer interface, to allow the user access to at least one application of a computing device. The authentication optimization system may be configured to allow at least one user to register and/or login to an application, a computing device, and/or a program. Additionally, the authentication optimization system uses a machine learning and/or classifying algorithm for classification of the brain data and/or prediction of the correct password of the user. The authorization optimization system may also be configured to synchronize brain activity to the at least one user, such that each login may be correctly correlated to the user, based on a predetermined accuracy threshold, eliminating fraudulent and/or unauthorized login via false identification, or the like.

20 Claims, 9 Drawing Sheets

(56) References Cited

U.S. PATENT DOCUMENTS

| | | | |
|---|---|---|---|
| 2020/0257787 A1* | 8/2020 | Eyole | A61B 5/117 |
| 2021/0290171 A1* | 9/2021 | Katnani | A61B 5/0082 |
| 2023/0315203 A1* | 10/2023 | Wei | G16H 20/30 |
| | | | 702/19 |

OTHER PUBLICATIONS

Al-Saegh, A. et al. Deep learning for motor imagery EEG-based classification: A review. Biomedical Signal Processing and Control. 2021, vol. 63.

Aggarwal, S. et al. Signal processing techniques for motor imagery brain computer interface: A review. Array. Jan. 2, 2019, 100003.

Fisher, R. S. Photic- and Pattern-induced Seizures: A Review for the Epilepsy Foundation of America Working Group. Epilepsia. 2005. 46(9):1426-1441.

Guger, C. et al. Comparison of dry and get based electrodes for P300 brain-computer interfaces. Frontiers in Neuroscience. 2012. vol. 6, Art. 60.

Zerafa, R. et al. To train or not to train? A survey on training of feature extraction methods for SSVEP-based BCIs. J. Neural Eng. 2018, 15, 051001.

Padfield, N. et al. EGG-Based Brain-Computer Interfaces Using Motor-Imagery: Techniques and Challenges. Sensors. 2019, 19, 1423.

Rui, Z. et al. A Survey on Biometric Authentication: Towards Secure and Privacy-Preserving Identification. IEEE Access. 2016. vol. 4.

Ekandem, J. I. et al. Evaluating the ergonomics of BCI devices for research and experimentation. Ergonomics. 2012. 55:5, 592-598.

Sadeghi, S. et al. Adaptive canonical correlation analysis for harmonic stimulation frequencies recognition in SSVEP-based BCIs. Turkish Journal of Electrical Engineering and Computer Sciences. 2019. vol. 27, No. 5, Art. 32.

Marcel, S. et al. Person Authentication Using Brainwaves (EEG) and Maximum A Posteriori Model Adaptation. IEEE Transactions on Pattern Analysis and Machine Intelligence, Apr. 2007, vol. 29, No. 4, pp. 743-748.

Gembler, F. et al. Exploring the Possibilities and Limitations of Multitarget SSVEP-based BCI Applications. Annu. Int. Conf. IEEE Eng. Med. Biol. Soc. 2016, 1488-1491.

* cited by examiner

SYSTEM OF AND METHOD FOR VISUAL BRAIN BASED AUTHENTICATION

CROSS-REFERENCE TO RELATED APPLICATIONS

This nonprovisional application claims priority to U.S. Provisional Application No. 63/490,716 entitled "A VISUAL BRAIN BASED AUTHENTICATION" filed Mar. 16, 2023 by the same inventors, all of which is incorporated herein by reference, in its entirety, for all purposes.

BACKGROUND OF THE INVENTION

1. Field of the Invention

This invention relates, generally, to an authentication framework for at least one application. More specifically, it relates to a system of a method for automatically authenticating an identity of a user, via a brain-computer interface, to allow the user access to at least one application of a computing device.

2. Brief Description of the Prior Art

Brain-Computer Interface (BCI)-based authentication systems allow users to interact with BCI technology, by using their brain data as a form of biometric authentication to enable participants to access systems securely. This brain activity, also known as Electroencephalogram (EEG), has been adapted to authentication due to the properties in brain data that make it effective, compared to other authentication methods, such as universality and uniqueness.

Traditionally, user authentication relied on passwords and identification cards, which, despite their widespread use, pose significant security risks. Passwords can be easily forgotten and identification cards are always at risk of being lost or stolen. Furthermore, biometric-based authentication systems that use fingerprint and facial recognition have potential challenges, as well. They can resolve the issues of remembrance and misplacement but are susceptible to replay attacks and the disclosure of a user's private biometric information when they try to access a system. As a result, research into an authentication method that can address the shortcomings of current biometric authentication systems is ongoing and of critical importance.

Accordingly, what is needed is safe, effective, and efficient system and method for automatically authenticating an identity of a user. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a method of automatically authenticating an identification of a user. In an embodiment, the method may comprise the following steps: (a) presenting, via a processor of a computing device, a plurality of stimuli on a display device associated with the computing device to the user for a predetermined amount of time; (b) recording, via a neurological headset communicatively coupled to the processor of the computing device, an electrical activity of a brain of the user, based on a response to each of the plurality of stimuli presented on the display device; (c) correlating, via the processor of the computing device, the electrical activity of the brain of the user for each stimuli of the plurality of stimuli to a predetermined electrical activity associated with a selection by the user; and (d) automatically authenticating, via the processor of the computing device, the identification of the user by: (i) based on a determination that the electrical activity of the brain of the user for a stimuli of the plurality of stimuli matches the predetermined electrical activity of the brain associated with the selection by the user, transmitting a notification indicative of a successfully identification of the user to the display device associated with the computing device, logging into an application, or both; and (ii) based on a determination that the electrical activity of the brain of the user for a stimuli of the plurality of stimuli does not match the predetermined electrical activity of the brain associated with the selection by the user, transmitting a notification indicative of an unsuccessfully identification of the user to the display device associated with the computing device, re-presenting the plurality of stimuli for the predetermined amount of time, or both.

In some embodiments, the processor further comprises at least one machine learning algorithm and/or at least one classifier. The method may further comprise the step of, filtering, via the at least one classifier of the processor, at least one P300 event-related potential from the electrical activity of the brain of the user.

In addition, in some embodiments, the computing device may further include a memory, such that the electrical activity associated with a selection by the user may be inputted into the memory of the computing device. In these other embodiments, electrical activity associated with a selection by the user may comprise at least one predetermined P300 event-related potential. As such, the step of comparing the electrical activity of the brain of the user for each stimulus of the plurality of stimuli to an electrical activity associated with a selection by the user may also comprise the step of, identifying, via the at least one classifier of the processor, the selected stimuli of the plurality of stimuli based on the filtered P300 event-related potential. Moreover, in these other embodiments, the step of comparing the electrical activity of the brain of the user for each stimuli of the plurality of stimuli to an electrical activity associated with a selection by the user further comprises the step of, calculating, via the at least one classifier of the processor, a likelihood of accuracy for the selected stimuli based on the comparison between the filtered P300 event-related potential and the at least one predetermined P300 event-related potentials dataset.

In some embodiments, the method may further comprise the step of inputting, via the processor of the computing device, the filtered P300 even-related potential into the at least one predetermined P300 event-related potentials dataset. In this manner, the method may further comprise the step of retraining, via the at least one machine learning algorithm of the processor, the likelihood of accuracy of the at least one predetermined P300 event-related potentials dataset based on at least one of the inputted filtered P300 event-related potential of the user, such that the predetermined amount of time for presenting the plurality of stimuli may be updated.

In some embodiments, the plurality of stimuli may be presented on the display device as a N×N matrix. Additionally, the step of presenting the plurality of stimuli may further comprise the step of, transitioning, via the processor of the computing device, each of the plurality of stimuli between a gray-scale color to an enhanced color scheme at a predetermined rate.

Another aspect of the present disclosure pertains to an authentication optimization system for automatically authenticating an identification of a user. In an embodiment, the authentication optimization system may comprise the following: (a) a computing device having a processor; (b) a neurological headset, the neurological headset being communicatively coupled to the processor; and (c) a non-transitory computer-readable medium operably coupled to the processor, the computer-readable medium having computer-readable instructions stored thereon that, when executed by the processor, cause the authentication optimization system to automatically authenticate an identity of a user by executing instructions comprising: (i) presenting, via a processor of a computing device, a plurality of stimuli on a display device associated with the computing device to the user for a predetermined amount of time; (ii) recording, via a neurological headset communicatively coupled to the processor of the computing device, an electrical activity of a brain of the user, based on a response to each of the plurality of stimuli presented on the display device; (iii) correlating, via the processor of the computing device, the electrical activity of the brain of the user for each stimuli of the plurality of stimuli to a predetermined electrical activity associated with a selection by the user; and (iv) automatically authenticating, via the processor of the computing device, the identification of the user by: (A) based on a determination that the electrical activity of the brain of the user for a stimuli of the plurality of stimuli matches the predetermined electrical activity of the brain associated with the selection by the user, transmitting a notification indicative of a successfully identification of the user to the display device associated with the computing device, logging into an application, or both; and (B) based on a determination that the electrical activity of the brain of the user for a stimuli of the plurality of stimuli does not match the predetermined electrical activity of the brain associated with the selection by the user, transmitting a notification indicative of an unsuccessfully identification of the user to the display device associated with the computing device, re-presenting the plurality of stimuli for the predetermined amount of time, or both.

In some embodiments, the processor further comprises at least one machine learning algorithm and/or at least one classifier. In some embodiments, the executed instructions may further comprise the step of, filtering, via the at least one classifier of the processor, at least one P300 event-related potential from the electrical activity of the brain of the user. In these other embodiments, the computing device may further include a memory, such that the electrical activity associated with a selection by the user may be inputted into the memory of the computing device.

In some embodiments, electrical activity associated with a selection by the user may comprise at least one predetermined P300 event-related potential. In this manner, the executed instructions step of comparing the electrical activity of the brain of the user for each stimulus of the plurality of stimuli to an electrical activity associated with a selection by the user may further comprise the step of, identifying, via the at least one classifier of the processor, the selected stimuli of the plurality of stimuli based on the filtered P300 event-related potential. In addition, the executed instructions step of comparing the electrical activity of the brain of the user for each stimuli of the plurality of stimuli to an electrical activity associated with a selection by the user may also include the step of, calculating, via the at least one classifier of the processor, a likelihood of accuracy for the selected stimuli based on the comparison between the filtered P300 event-related potential and the at least one predetermined P300 event-related potentials dataset.

In some embodiments, the executed instructions may further comprise the step of inputting, via the processor of the computing device, the filtered P300 even-related potential into the at least one predetermined P300 event-related potentials dataset. These other embodiments, the executed instructions further comprise the step of retraining, via the at least one machine learning algorithm of the processor, the likelihood of accuracy of the at least one predetermined P300 event-related potentials dataset based on at least one of the inputted filtered P300 event-related potential of the user, such that the predetermined amount of time for presenting the plurality of stimuli may be updated.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
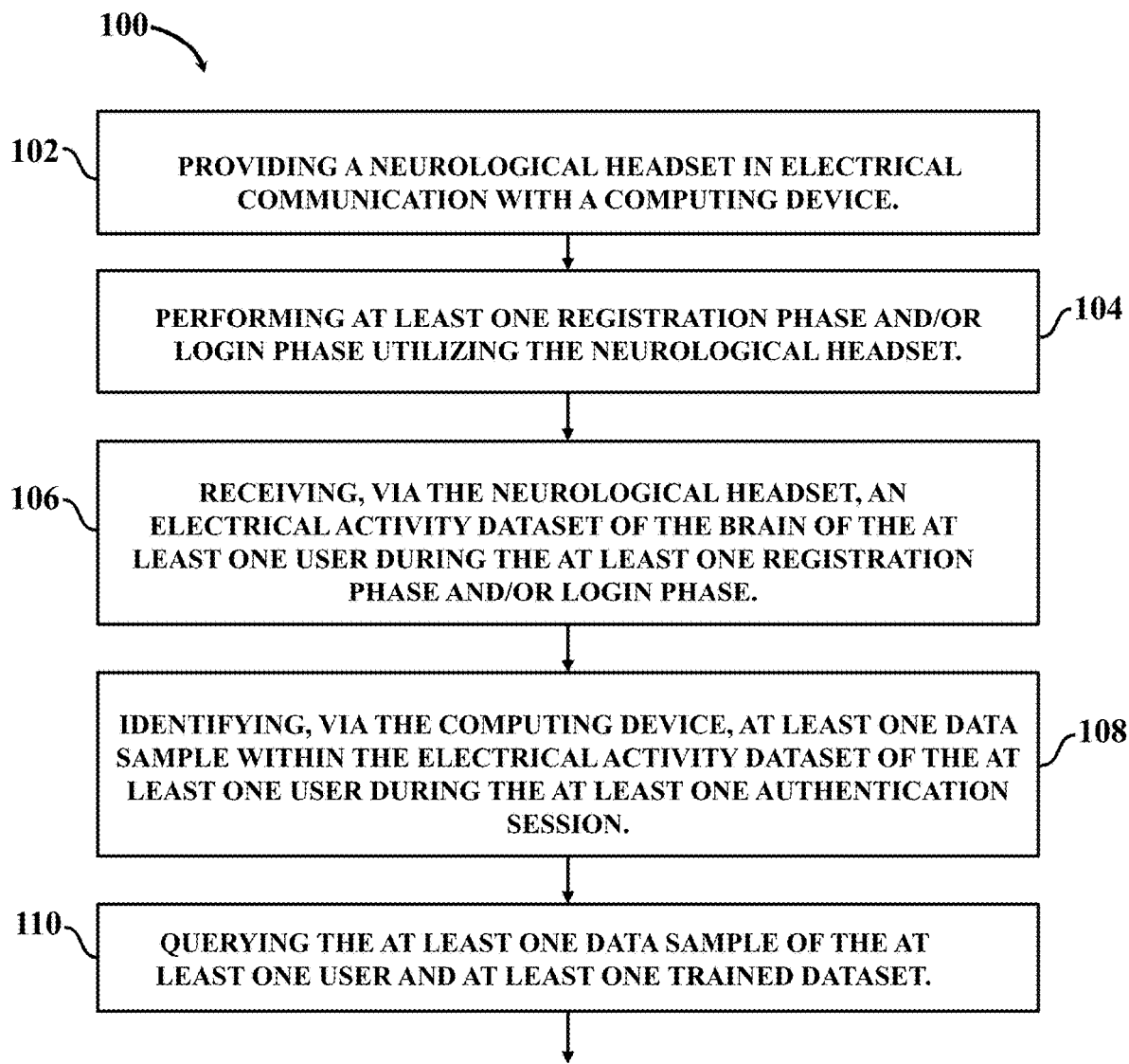
FIG. 1 is a process flow diagram depicting a method of automatically authenticating an identify of a user, according to an embodiment of the present disclosure.
Figure 1:
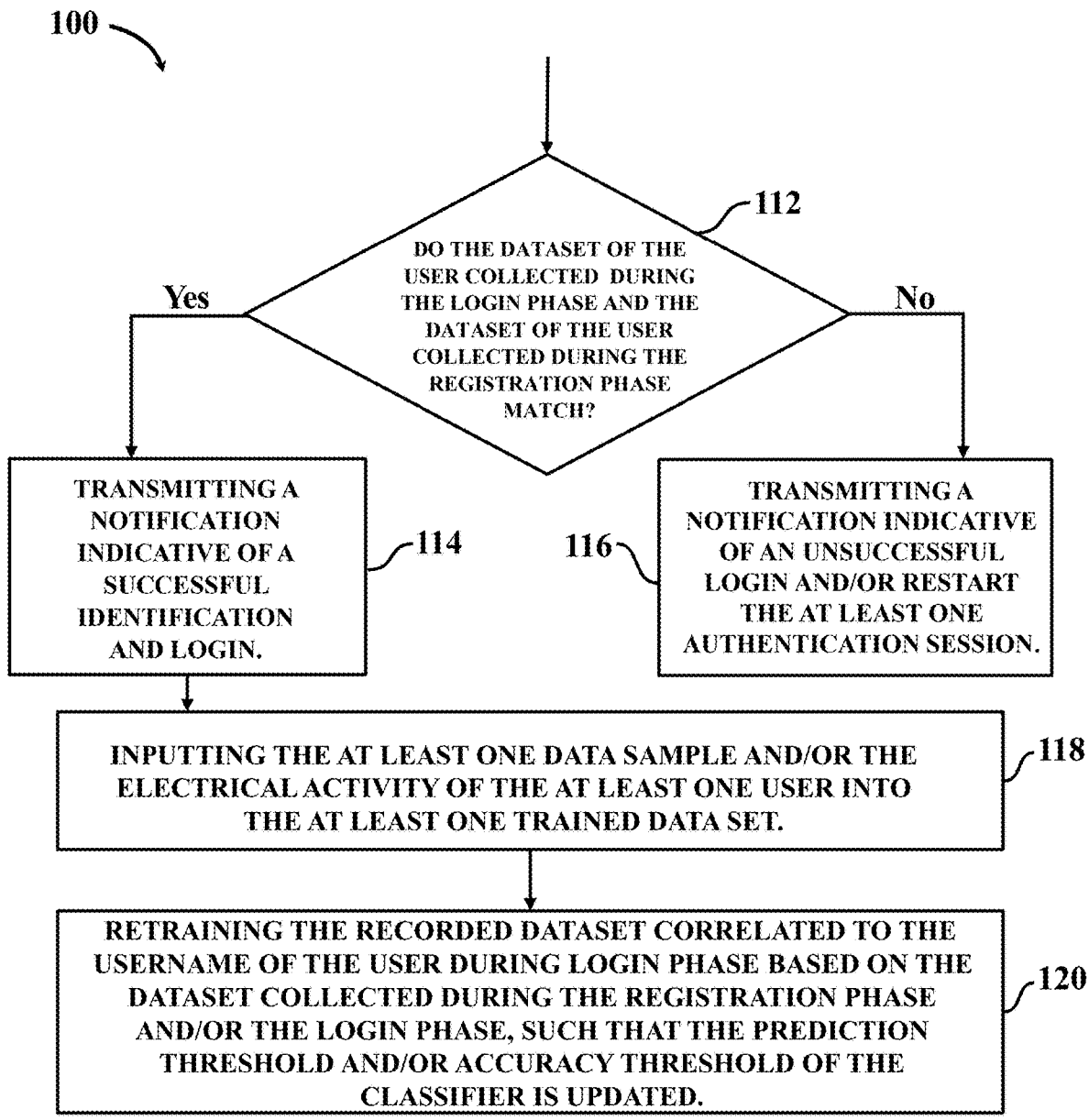

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention.

As such, elements/components shown in diagrams are illustrative of exemplary embodiments of the disclosure and are meant to avoid obscuring the disclosure. Any headings, used herein, are for organizational purposes only and shall not be used to limit the scope of the description or the claims.

Furthermore, the use of certain terms in various places in the specification, described herein, are for illustration and should not be construed as limiting. For example, any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Therefore, a reference to first and/or second elements does not mean that only two elements may be employed there or that the first element must precede the second element in some manner. Also, unless stated otherwise a set of elements may comprise one or more elements Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Referring in general to the following description and accompanying drawings, various embodiments of the present disclosure are illustrated to show its structure and method of operation. Common elements of the illustrated embodiments may be designated with similar reference numerals.

Accordingly, the relevant descriptions of such features apply equally to the features and related components among all the drawings. For example, any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g. circuitry), as programmable circuitry appropriately programmed with software and/or firmware, or as a combination of special-purpose and programmable circuitry. Hence, embodiments may include a computer-readable medium having stored thereon instructions which may be used to program a computer (or other electronic devices) to perform a process.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program PIN embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program PIN embodied on a computer readable medium may be transmitted using any appropriate medium, including but not limited to wireless, wire-line, optical fiber cable, radio frequency, etc., or any suitable combination of the foregoing. Computer program PIN for carrying out operations for aspects of the present invention may be written in any combination of one or more programming languages, including an object oriented programming language such as Java, C#, C++, Python, MATLAB, and/or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As used herein, the term "communicatively coupled" refers to any coupling mechanism configured to exchange information (e.g., at least one electrical signal) using methods and devices known in the art. Non-limiting examples of communicatively coupling may include Wi-Fi, Bluetooth, wired connections, wireless connection, quantum, and/or magnets. For ease of reference, the exemplary embodiment described herein refers to Wi-Fi and/or Bluetooth, but this description should not be interpreted as exclusionary of other electrical coupling mechanisms.

As used herein, the term "motor imagery" refers to any imaging of a movement to perform an action known in the art. For ease of reference, the exemplary embodiment described herein refers to imaging the movement of an object, such as the transition of a color display on a set of images and/or videos, but this description should not be interpreted as exclusionary of other movement imaging.

As used herein, the terms "about," "approximately," or "roughly" refer to being within an acceptable error range (i.e., tolerance) for the particular value as determined by one of ordinary skill in the art, which will depend in part on how the value is measured or determined (e.g., the limitations of a measurement system), (e.g., the degree of precision required for a particular purpose, such as automatically authenticating an identity of a user, via a brain-computer interface, to allow the user access to at least one application of a computing device). As used herein, "about," "approximately," or "roughly" refer to within ±25% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Identity Authentication Optimization System

The present disclosure pertains to automatically authenticating an identity of a user (hereinafter "authentication optimization system"). In an embodiment, the present disclosure may comprise an authentication optimization system, such that the authentication optimization system may comprise at least one machine learning-algorithm.

In an embodiment, the authentication optimization system may involve user registration by selecting an image pattern for their account through user interaction with the authentication optimization system. After registration, users may be required to select the same image pattern selection when attempting to log into the system. The authentication optimization system may then be configured to verify the identity of the user by comparing the current login attempt's brain activity data with the data during registration. Successful authentication relies on both the correct image pattern selection and the matching of their brain activity data between their registration and login attempts. In this embodiment, the authentication optimization system may be BCI-based, such that the authentication optimization system address the weaknesses of previous authentication methods. By leveraging brain activity data, the authentication optimization system may ensure higher levels of security as brainwave patterns are more difficult to replicate or steal and are unique to every user.

FIG. 1 depicts an exemplary process flow diagram depicting a method 100 of automatically authenticating the identify of at least one user based on a brain frequency of the at least one user, according to an embodiment of the present disclosure. The steps delineated in FIG. 1 are merely exemplary of an order of authenticating an identify of at least one user based on the brain frequency of the at least one user. The steps may be carried out in another order, with or without additional steps included therein.

As shown in FIG. 1, in an embodiment, method 100 begins with step 102, providing an authentication optimization system comprising a neurological headset configured to be worn by at least one user during at least one authentication session. As such, the neurological headset, such as a brain computer interface (hereinafter "BCI") may be communicatively coupled (e.g., in electrical communication) with at least one computing device, the computing device having at least one processor and/or a graphical user interface. In addition, a display device may be communicatively coupled to the authentication optimization system and/or the computing device.

The following section will discuss how users could interact with a BCI-based authentication application, and the process in which the data is acquired and post-processed for the corresponding BCI methods.

Motor Imagery

As shown in FIG. 1, method 100, at step 104, subsequent to providing the neurological headset, the user may perform at least one registration phase and/or login phase utilizing the neurological headset. Accordingly, a dataset (e.g., EEG data) for motor imagery-based tasks may be collected and/or recorded by the neurological headset. For example, in some embodiments, the dataset (e.g., EEG data) may be recorded by giving the user an interface to control different types of applications and devices, such as quadcopter drones, wheelchairs, and/or virtual reality.

Referring again to FIG. 1, in an embodiment, method 100 may proceed to step 106, receiving, via the neurological headset of the authentication optimization system, the dataset (e.g., EEG data) of the user during the at least one registration phase and/or the login phase. Additionally, in this embodiment, when the dataset is acquired, the authentication optimization system may be configured to post-process the dataset through feature extraction techniques, via the at least one processor of the at least one computing device. In this manner, as shown in FIG. 1, during step 108 and/or step 110 of method 100 in this embodiment, the dataset may be classified by the type of motor imagery performed, such as hand movements, foot movements, and word generation. Non-limiting examples of the feature extraction techniques may include but are not limited to Fourier transform, wavelet transform, and/or common spatial pattern to obtain this information from the dataset. Furthermore, in this embodiment, the authentication optimization system may comprise at least one classifier, such that the at least one classifier may include deep neural networks, linear discriminate analysis (hereinafter "LDA"), and support vector machines (hereinafter "SVMs"). For example, in this embodiment, the authentication optimization system may be configured to pass these extracted features to the classifier to translate the motor imagery commands a user may have desired to evoke onto an object, based on the classification's predictions.

Event-Related Potentials

As used herein, the term "Event-related potentials" (ERPs) refer to any response in the electrical activity of a user's brain known in the art, as a result of interacting with a system that evokes a stimulus event. Non-limiting examples of the even-related potentials may include a P300 wave, P5 wave, N100, P200, N200, N300, N400, and/or P600. For ease of reference, the exemplary embodiment described herein refers to P300 waves, but this description should not be interpreted as exclusionary of other ERP brain waves. As such, a P300 wave is an ERP that is generated in a person's EEG data, which occurs around 300 ms, following a visual display of a stimulus that a participant has concentrated on.

Figure 2:
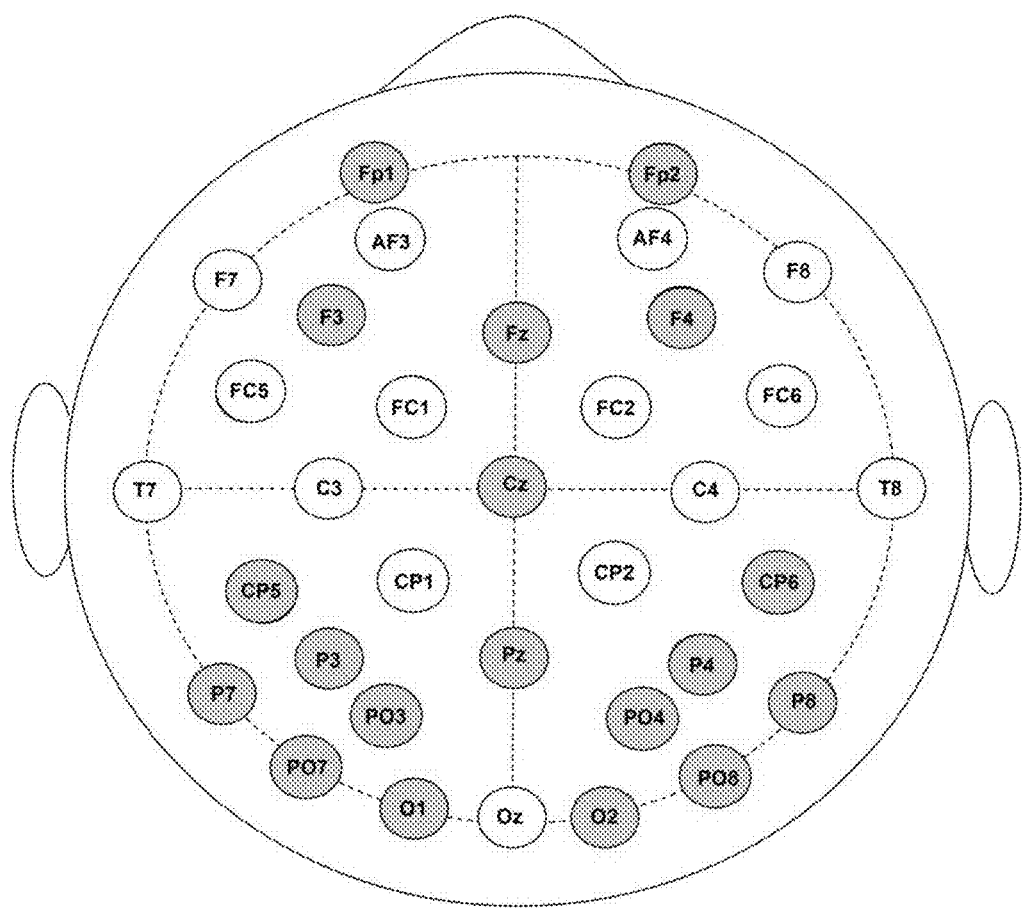
FIG. 2 is a graphical representation depicting an exemplary embodiment of an electrode and/or sensor location of a neurological headset of the authentication optimization system of FIG. 1, according to an embodiment of the present disclosure.
Figure 3:
FIG. 3 is a graphical representation depicting a first exemplary embodiment of a P300 sampler on a display device of an authentication optimization system during a registration phase and/or a login phase, according to an embodiment of the present disclosure.
Figure 4:
FIG. 4 is a graphical representation depicting a second exemplary embodiment of a P300 sampler on a display device of an authentication optimization system during a registration phase and/or a login phase, according to an embodiment of the present disclosure.
Figure 5:
FIG. 5 is a graphical representation depicting the first exemplary embodiment of the P300 sample on the display device of the authentication optimization system of FIG. 3 during the registration phase and/or the login phase, with the target stimulus distorted (e.g., colored image) and the remaining stimuli in their original formatting (e.g., grayscale colored images), according to an embodiment of the present disclosure.
Figure 6:
FIG. 6 is a graphical representation depicting the second exemplary embodiment of the P300 sample on the display device of the authentication optimization system of FIG. 4 during the registration phase and/or the login phase, with the target stimulus distorted (e.g., colored image) and the remaining stimuli in their original formatting (e.g., grayscale colored images), according to an embodiment of the present disclosure.

As shown in FIG. 2, in an embodiment, as disclosed above, the neurological headset of the authentication optimization system may be communicatively coupled to the computing device having the at least one processor. In this embodiment, the neurological headset may comprise a plurality of electrode channels (e.g., 10-20 international system). In this manner, the plurality of electrode channels may be located around the parietal lobe of the brain, as shown in FIG. 2.

In an embodiment, the authentication optimization system may comprise at least one display device communicatively coupled to the at least one processor of the computing device. In this manner, the authentication optimization system may also comprise a P300 speller configured to be visually displayed on the display device. In this embodiment, the P300 speller may be configured in the form of a matrix. In this manner, the rows and/or columns of this matrix may flash in a random pattern, called the oddball paradigm, to illicit this P300 response. Additionally, in this embodiment, in order to improve the classification performance of the EEG data, the authentication optimization system may post-process the P300 response to the P300 speller through at least one Independent Component Analysis ("ICA"), via the at least one processor, to remove artefacts.

As used herein, the term "artefact(s)" refers to any noise that is unwanted data known in the art that may be mixed into EEG data. Non-limiting examples of artefact(s) may include noise from external sources outside of EEG data, such as electrooculography (EOG), electromyogram (EMG), and electrocardiogram (EKG), which are the result of eye blinks, muscle movement, and heart rate, respectively. For ease of reference, the exemplary embodiment described herein refers to noise from EOGs, EMGs, and/or EKGs, but this description should not be interpreted as exclusionary of other unwanted data that may be mixed into EEG data.

Referring again to FIG. 1, in an embodiment, method 100 next turns to steps 112, 114, and/or 116, classifying the collected dataset of the user, such that the authentication optimization system may correlate and/or compare the collected dataset with a recorded dataset to predict a target stimulus and/or stimuli of the user. In this embodiment, after the authentication system performs ICA, the at least one processor may be configured to transmit an electrical signal, such that this information may be passed to a classifier, including but not limited to an LDA classifier and/or Quadratic Discriminant Analysis (QDA), such that the authentication optimization system may be configured to receive and/or output predictions on which option out of the matrix a user may have been focusing on. Finally, as shown in FIG. 1, at step 118 and/or step 120, in this embodiment, once the classifier has outputted a prediction, the authentication optimization system may be configured to record the information and/or the prediction within the memory of the computing device. In this manner, the authentication optimization system may be configured to update, train, and/or retrain the classifier (e.g., the LDA classifier and/or the QDA classifier) to increase the accuracy of the classifier.

SSVEPs

Moreover, in an embodiment, the authentication optimization system may be configured to incorporate at least one Steady State Visually Evoked Potential (hereinafter "SSVEP") by enabling relatively accurate and/or fast input commands with lower amounts of training needed by the user. In this manner, the authentication optimization system may be configured to collect and/or record the at least one SSVEP via providing subjects with several options on the display device communicatively coupled to the at least one processor as at least one stimulus. Accordingly, in this embodiment, the at least one processor of the authentication optimization system may be configured to flash each of the several options on the display device in a random frequency, such that a user may focus on at least one of these options. As such, the authentication optimization system may be configured to collect and/or transmit several frequencies to a memory of the computing device. In addition, once the several frequencies have been collected, the authentication optimization system may be configured to identify a specific target frequency using post-processing techniques on the EEG data. For example, in some embodiments, the authentication optimization system may initialize conventional canonical correlation analysis (CCA) to recognize the desired target frequency, using at least one correlation value obtained by CCA.

BCI Authentication Application

Our BCI authentication application is based on the P300 event-related potentials of the user's brain. It creates a direct interaction link between the user's brain and the authentication application, allowing the former to authenticate into the system using the P300 component of their EEG brain activity Application User Interface In an embodiment, as disclosed above, the display device of the authentication optimization system may be configured to activate the P300 speller. In this embodiment, when the P300 speller is activated, the display device may visualize a set matrix comprising of a visual stimulus. Non-limiting examples of the visual stimulus (i.e., options) may include images, numbers, videos, and/or any other visual stimulus known in the art. For ease of reference, the exemplary embodiment described herein refers to images, but this description should not be interpreted as limiting to other visual stimuli. Additionally, in this embodiment, the rows and/or columns of the matrix may comprise a N×N matrix. For example, in some embodiments, the matrix may be a 2×2 matrix of visual stimuli (e.g., images). In this manner, in some embodiments, the matrix may be a 3×3 matrix of visual stimuli; in some embodiments, the matrix may be a 4×4 matrix of visual stimuli; in some embodiments, the matrix may be a 5×5 matrix of visual stimuli; in some embodiments, the matrix may be a 6×6 matrix of visual stimuli; in some embodiments, the matrix may be a 7×7 matrix of visual stimuli; in some embodiments, the matrix may be a 8×8 matrix of visual stimuli; in some embodiments, the matrix may be a 9×9 matrix of visual stimuli; in some embodiments, the matrix may be a 10×10 matrix of visual stimuli.

In an embodiment, as shown in FIGS. 3-6, the matrix of the P300 speller of the authentication optimization system may comprise a set of visual stimuli (e.g., images of superhero characters and/or university images). Each of these visual stimuli represents the different options that users may potentially select to formulate an authentication identification (e.g., a password). In this embodiment, the authentication optimization system may be configured to initially display the visual stimuli in greyscale color and/or alternative color and/or rotation and/or any visual distortion known in the art. In this manner, during the authentication process each visual stimuli will transition between the distortion (e.g., greyscale color image) and the original image (e.g., color images) in a flashing state. As such, the authentication optimization system may be configured to flash, via the at least one processor of the computing device, on the display device the rows and/or columns in the matrix according to the P300 speller (e.g., oddball paradigm), such that the authentication optimization system may elicit and/or record at least one P300 event-related potential in the user when the user focuses their attention on the flashing row and/or column containing the visual stimuli targeted by the user (hereinafter "target stimuli"). In this embodiment, the authentication optimization system may be configured to identify the target stimuli selected by the subjects in the matrix and correlate the P300 wave associated with the target stimuli to represent their registration and/or login authentication identity (e.g., password), such that the authentication optimization system may be configured to activate and/or open the application and/or computing system. After login, in this embodiment, the authentication optimization system may be configured to transmit a notification, via the display device communicatively coupled to the at least one processor, indicative of feedback on the screen (e.g., a pop-up message), requesting confirmation if the images the authentication optimization system selected during registration and login are a match to the target stimuli of the user. Additionally, in some embodiments, after login, the authentication optimization system may also be configured to transmit a notification indicative of feedback requesting confirmation from the user regarding whether the user was able to successfully login or not. As such, the authentication optimization system may be configured to allow the user to interact with the application by participating in four different phases: training, registration, login, and/or authentication.

Figure 7:
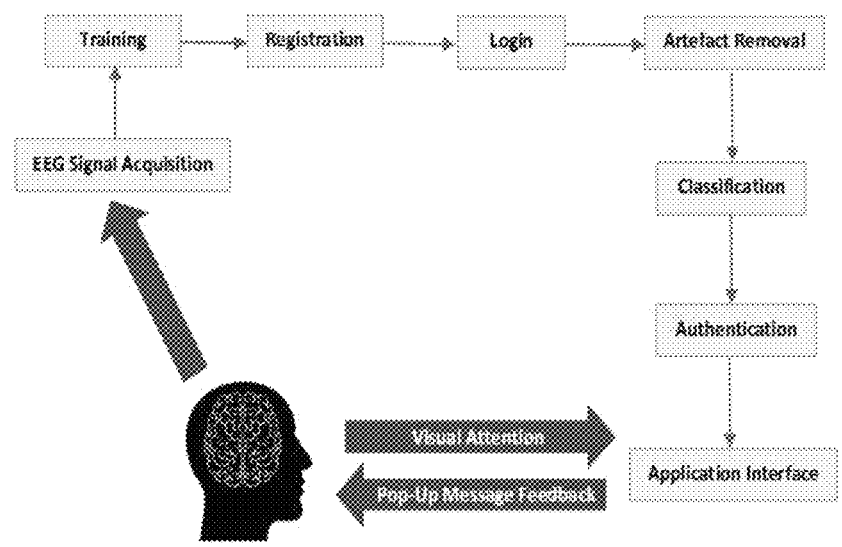
FIG. 7 is a graphical representation depicting a flow chart of the authentication identification process for the authentication optimization system of FIG. 1, according to an embodiment of the present disclosure.

FIG. 1, in conjunction with FIG. 7, depict a flowchart and/or an architecture of the authentication optimization system, according to an embodiment of the present disclosure. In this embodiment, as shown in FIG. 1, in conjunction with FIG. 7, as disclosed above, at step 104 of method 100, first, the electrical brain activity of the user may be acquired from a scalp of the user while the neurological headset (e.g., EEG headset) communicatively coupled to the at least one processor may be disposed about a portion of the scalp of the user, while the user interacts with the visual stimuli on the display device communicatively coupled to the at least one processor. Next, the collected dataset (e.g., EEG data) may then be cleaned from noise through artefact removal techniques. Then, the acquired dataset, collected during registration and/or login may be classified to obtain an accuracy of how likely the data is a match to the target stimulus of the user. In this manner, as disclosed above the authentication optimization system may also present feedback to the user, via at least one notification transmitted to the display device (e.g., a pop-up display message) indicative of the user being successfully authenticated into the system or not. The entire process is described in detail below.

Training Phase

Figure 8:
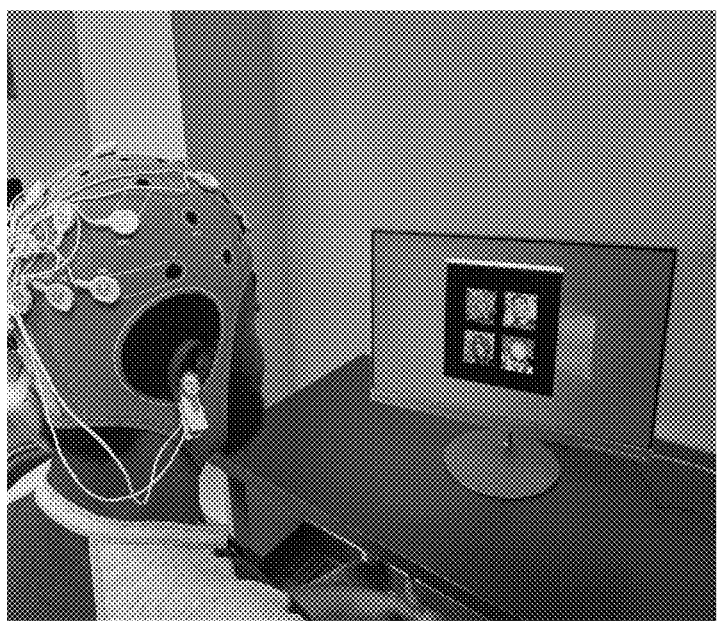
FIG. 8 is a photo illustrating the neurological headset of the authentication optimization system FIG. 2 as worn by a user, according to an embodiment of the present disclosure.

As disclosed above, as shown in FIG. 1, in conjunction with FIG. 7, at step 106 and/or step 108 of method 100, in an embodiment, before beginning the training phase, the user may be introduced to the authentication optimization system, such that the authentication optimization system may display, via the display device, a visual, tactile, and/or auditory disclosure of how the P300 speller works. In this embodiment, the process may also include how to focus on the P300 matrix to perform password selection, by counting the number of flashes to stay engaged, and/or transmitting a notification to the display device indicative of confirming if the user had any additional questions. In this manner, once training commences, the authentication optimization system may perform at least one training session, where the dataset (e.g., EEG data) of the user may be recorded, while the user may concentrate on the visual stimuli in the P300 speller. For example, in some embodiments, the authentication optimization system may undergo six training sessions Moreover, FIG. 8 depicts a user undergoing the training session of the authentication optimization system, according to an embodiment of the present disclosure. As shown in FIG. 1, in conjunction with FIG. 7 and FIG. 8, at step 106 and/or step 108 of method 100, in an embodiment, the user may focus on the P300 matrix shown on the display device communicatively coupled to the at least one processor of the authentication optimization system. During training, the authentication optimization system may be configured to transmit an electrical signal to the display device, via the at least one processor, such that the user may be guided on which specific visual stimuli to focus on at a time, by indicating the desired visual stimulus with a bounding box (e.g., a red box disposed about the perimeter of the visual stimulus) overlaying it in the matrix.

In an embodiment, the indication of the desired visual stimulus may occur for a predetermined period of time (e.g., 1 second, 5 seconds, 10 seconds, 15 seconds, 20 seconds, and/or etc.), before all the visual stimuli start to flash to give participants enough time to switch target stimulus. Over the course of the session, the authentication optimization system may cause all the visual stimulus to remain static. In this manner one, visual stimulus may be overlaid with a bounding box (e.g., a red box disposed about the perimeter of the visual stimulus) for the user to know where to look at, then all of the visual stimuli may be displayed on the display device will flash in a random pattern using the P300 speller (e.g., the oddball paradigm). As such, each time throughout the training session, the authentication optimization system may be configured to transition the bounding box from one visual stimulus to another, allowing the user to switch from one random target stimulus to the next.

In an embodiment, as shown in FIG. 7, in conjunction with FIG. 1, once all training sessions have completed, the authentication optimization system may be configured to transmit a notification, via the at least one processor, to the display device, indicative of completion of the training session, such that the user may stop focusing on the P300 speller. Accordingly, the at least one processor may be configured to transmit the dataset to the memory of the computing device and/or the at least one classifier, in addition to sending an electrical signal to the at least one classifier (e.g., a Linear Discriminant Analysis (LDA) classifier), activating the at least one classifier to generate a model based on the transmitted dataset, to be saved for use in the registration and login phases.

Registration Phase

Additionally, as shown in FIG. 7, in conjunction with FIG. 1, at step 106 and/or step 108, in an embodiment, after the training sessions have been complete, the authentication optimization system may be configured to initiate a registration phase. The registration phase may be initiated, by first, the at least one processor transmitting an electrical signal to the display device, such that the display device comprises a notification (e.g., visual, haptic, and/or auditory) instructing the user of how they will interact with the authentication optimization system and/or the differences between the registration phase and the training phase. When the phase is ready to begin, the authentication optimization system, via the at least one processor transmitting an electrical signal to the display device, may request the user to enter a username into the system, using a user-interface (e.g., a keyboard, a mouse, and/or a microphone) communicatively coupled to the computing device of the authentication optimization system. The notification may be presented to the user, via the display device, asking the user to select a username to register their account for the first time. Accordingly, the at least one processor of the authentication optimization system may be configured to transmit the username of the user to the memory of the computing device, such that the authentication optimization system may retain, correlate, and/or identify the dataset of the user with the selected username. In this manner, the authentication optimization system may be configured to transmit an interactive input field on the display device, via the at least one processor, available at this time for them to enter their username, such that the user may input the username, via the user-interface to continue and/or close the transmitted notification.

Moreover, in an embodiment, by requesting users to create a username before the dataset (e.g., EEG data) collection commences, the authentication optimization system may be configured to use this information during the login phase to confirm if the user presently exists in the system or not. In this embodiment, after the message has closed, the P300 matrix may appear and/or may follow a similar behavior to the training phase. As such, during the registration phase, the authentication optimization system may allow the user to determine which password they would like to select from the visual stimuli (e.g., images) in the P300 matrix as shown on the display device. These visual stimuli would be the same ones used in the P300 speller for training, as the authentication optimization system may correlate the P300 stimuli collected and/or recorded in the memory of the computing device from the training phase with the registration phase to maintain consistency between each phase for proper classification in the future.

Furthermore, in an embodiment, the registration phase password selection may comprise selecting two options from the matrix, but not at the same time. Accordingly, in an embodiment, for the first visual stimulus the user may choose, the user will focus on it, while each of the rows and/or columns of the matrix flash. In this manner, the authentication optimization system, via the at least one processor, may be configured to inhibit the flashing for a predetermined period of time (e.g., 30 second, 60 seconds, 90 seconds, and/or etc.) and a bounding box (e.g., a red box disposed about the perimeter of a visual stimulus) will overlay the specific stimulus (e.g., the target stimulus) the algorithm has predicted was the visual stimulus the user chose as the password. As such, in this embodiment, the authentication optimization system may be configured to repeat the process for a predetermined number of sessions (e.g., 1 session, 3 sessions, 6 sessions, 12 sessions, and/or etc.) while the user will either continue looking at the same visual stimulus to choose it again, and/or switch targets to select a different visual stimulus for their second password.

As shown in FIG. 1, in conjunction with FIG. 7, at step 110 of method 100, the authentication optimization system may identify the target stimulus the user selected, by loading the training phase of the user, passing dataset of the user recorded during registration as testing data to the model, and/or then classifying the data to make a prediction on which positions in the matrix were the ones they focused on. For example, in some embodiments, since P300 speller of the authentication optimization system may comprise a 2×2 matrix, the visual stimulus may be predicted by [0,0], [0,1], [1,0], [1,1], corresponding to the top left, top right, bottom left, and/or bottom right images, respectively. Accordingly, in these other embodiments, once the at least two passwords have been confirmed for registration, the username of the user, dataset (e.g., EEG data) of the user, and/or the row and column information that corresponds to the visual stimulus the user selected, may be saved to a database and/or may be recorded within the memory of the computing device. In this manner, a database is useful, as it may allow the authentication optimization system to maintain a record of who has accessed the system for registration and/or to know what password is correlated to the username of the user. As such, in an embodiment, once the registration phase has completed, the authentication optimization system may proceed to the login phase.

Login Phase

As shown in FIG. 7, in conjunction with FIG. 1, in an embodiment, when the login phase begins, the authentication optimization system may be configured to transmit, via the at least one processor, a notification to the display device requesting the user input their username created during the registration phase. If the username is successfully found within the memory of the computing device, the authentication optimization system may be configured to activate login, such that the P300 matrix may appear on the display device and/or the same process will follow as in registration. In the case that the username fails, the authentication optimization system may transmit a notification to the user indicative of retrying the username and/or requesting the user return to the registration phase. In this embodiment, while the users focus on the P300 matrix in the login phase, the authentication optimization system may collect the dataset (e.g., EEG data) of the user, such that the authentication optimization system may identify and/or correlate the P300 wave for the target stimulus and the recorded P300 wave of the target stimulus during the registration phase. In this manner, once the two passwords have been confirmed, then the authentication optimization system may transition and/or commence to an authentication phase.

Authentication Phase

In an embodiment, during the authentication phase, the authentication optimization system may ensure that the user that is accessing the account is the genuine person it belongs to, and not a potential imposter. As such, as shown in FIG. 7, in conjunction with FIG. 1, at steps 112, 114, 116, 118, and/or 120 of method 100, after the login phase ends, the at least one processor of the authentication optimization system may be configured to pass the dataset (e.g., EEG data) of the user recorded in both the registration and login phases into at least one algorithm known in the art configured to remove artefacts (e.g., an independent component analysis (ICA) algorithm). For ease of reference, the exemplary embodiment described herein refers to the ICA algorithm, however, this description should not be interpreted as exclusionary to other algorithms configured to remove artefacts. By processing the dataset of the user (e.g., EEG data) through the at least one algorithm, the authentication optimization system may be configured to obtain cleaner data and/or improve the classification performance. As shown in FIG. 1, at step 112 of method 100, in this embodiment, when the at least one algorithm is complete, the authentication optimization system may be configured to compare and/or match the registration dataset of the user with their login data using the cosine similarity to determine if the user is the user correlated to the username and/or account data within the memory of the computing device of the authentication optimization system. The cosine similarity is applicable for classification, because the dataset of the user may be reshaped into a vector and/or computed to measure the similarity between the two vectors from registration and/or login. In this manner, in this embodiment, the result found from the cosine similarity gives a matching score between −1 and 1, to identify the probability of the two compared vectors being closely related, independent, or unrelated. The following equation represents the cosine similarity, which is the ratio of the dot product of these two vectors and the product of magnitude of these vectors:

$$\text{similarity } (u, v) = \frac{u, v}{\|u\|\|v\|} \quad (1)$$

As such, the authentication optimization system may comprise a threshold accuracy of 95% for authenticating a user. Accordingly, if a genuine user is attempting to access their account, the authentication optimization system may require the user obtain a classification accuracy of at least 95% to successfully login. Based on the comparison of the cosine similarity, when an imposter attempts to access a genuine subject's account, the authentication optimization system may be configured to prevent access, as the imposter user is unable to achieve an accuracy higher than 95%. Additionally, in this embodiment, the authentication optimization system may be configured to increase the required threshold of accuracy based on the user and/or the number of times the user has accessed the application and/or computing device. For example, in some embodiments, the accuracy threshold for the user may be at least 98% and, in another embodiment, the accuracy threshold for the user may be at least 99.5%. Furthermore, the increase in the accuracy threshold may widen the gap between the ability for an imposter to try to use their brain data to login as the genuine user, because their accuracy would not be as high.

Referring again to FIG. 1, in an embodiment, method 100 then proceeds to either step 114 or step 116, depending on whether a substantial match exists between the collected dataset (e.g., EEG data) of the user during the login phase and collected dataset of the user during the registration phase. Accordingly, in this embodiment at step 114, if the authentication is successful (e.g., the user achieves an accuracy score of at least 95%), the authentication optimization system may transmit a notification to the display device indicative of a successful login worked, such that the user may be allowed into their account. In this manner, as shown in FIG. 1, method 100 may then proceed to the final two steps, step 118 and step 120, in which, once the classifier has outputted a prediction (i.e., cosine similarity), the authentication optimization system may be configured to record the information and/or the prediction and/or accuracy threshold within the memory of the computing device. In this manner, the authentication optimization system may be configured to automatically update, train, and/or retrain the classifier (e.g., the LDA classifier and/or the QDA classifier) to increase the prediction and/or accuracy of the classifier, in real-time.

However, in this embodiment, if the authentication has failed, method 100 proceeds to step 116, in which the authentication optimization system may proceed with two possible options. If the cosine similarity obtained is within a predetermined range to the about 95% accuracy threshold, for example between about 85% and about 94%, the authentication optimization system may be configured to transit a notification to the display device indicative of a failed login, and/or the notification may also query the user to determine if the user may be interested in in learning more about why their attempt failed. As such, the authentication optimization system may provide the user with a break-down synopsis of the failed login, including but not limited to the user not being as focused as they were during registration compared to login, so their affective state can be checked. The authentication system may also separate the user dataset for the registration phase and/or the login phase into alpha, beta, and theta bands, and the cosine similarity would be performed on each individual band. In this manner, if the user obtains high similarity scores between each band, the authentication optimization system may allow the user to login using their real-time and/or recorded affective state instead of their recorded dataset (e.g., EEG data) and/or EEG data in real-time.

Furthermore, in this embodiment, depending on the specific results of each band, the authentication optimization system may be configured to automatically transmit and/or display (e.g., auditory, visual, tactile, haptic, etc.) a notification to the display device, in real-time, indicative of informing the user on why their authentication may have failed. The authentication optimization system may inform the user of possible reasons for their failed attempt including but not limited to the user lacking focus, the user being too relaxed, and/or the user being too drowsy during their login attempt. Any of these states can affect their EEG data and/or prevent the user from achieving a high enough similarity score. On the other hand, in this embodiment, if the cosine similarity results are substantially different (e.g., less than about 85%), the authentication optimization system may refuse access to the account of the user, the activation of an application and/or program, and/or any other computing device, program and/or application known in the art which requires a login. Additionally, when the cosine similarity results are substantially different, the authentication optimization system may transmit and/or display a notification on the display device, via the at least one processor, indicative of informing the user of being required to attempt login again in order to access the computing device, application, and/or program.

CONCLUSION

The BCI-based authentication optimization system may improve the facets of biometric authentication, as it relates to the challenges faced by other forms of authentication, due to the properties of the collected and/or recorded dataset (e.g., EEG data) of the user. In this manner, the authentication optimization system may be configured to comprise an accuracy threshold of at least about 95% in order to appropriately and/or automatically authenticate and/or correlate the user with the recorded dataset of the user, in real-time.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Abouelmehdi, K., Beni-Hessane, A., Khaloufi, H.: Big healthcare data: preserving security and privacy. Journal of big data 5(1), 1-18 (2018).

Aggarwal, S., Chugh, N.: Signal processing techniques for motor imagery brain computer interface: A review. Array 1, 100003 (2019).

Al-Saegh, A., Dawwd, S. A., Abdul-Jabbar, J. M.: Deep learning for motor imagery eeg-based classification: A review. Biomedical Signal Processing and Control 63, 102172 (2021).

Ekandem, J. I., Davis, T. A., Alvarez, I., James, M. T., Gilbert, J. E.: Evaluating the ergonomics of bci devices for research and experimentation. Ergonomics 55(5), 592-598 (2012).

Fisher, R. S., Harding, G., Erba, G., Barkley, G. L., Wilkins, A.: Photic- and pattern induced seizures: a review for the epilepsy foundation of America working group. Epilepsia 46(9), 1426-1441 (2005).

Gembler, F., Stawicki, P., Volosyak, I.: Exploring the possibilities and limitations of multitarget ssvep-based bci applications. In: 2016 38th Annual International Conference of the IEEE Engineering in Medicine and Biology Society (EMBC). pp. 1488-1491. IEEE (2016).

Guger, C., Krausz, G., Allison, B. Z., Edlinger, G.: Comparison of dry and gel based electrodes for p300 brain-computer interfaces. Frontiers in neuroscience 6, 60 (2012).

Marcel, S., Millán, J. d. R.: Person authentication using brainwaves (eeg) and maximum a posteriori model adaptation. IEEE transactions on pattern analysis and machine intelligence 29(4), 743-752 (2007).

Padfield, N., Zabalza, J., Zhao, H., Masero, V., Ren, J.: Eeg-based brain-computer interfaces using motor-imagery: Techniques and challenges. Sensors 19(6), 1423 (2019).

Rui, Z., Yan, Z.: A survey on biometric authentication: Toward secure and privacy preserving identification. IEEE access 7, 5994-6009 (2018).

Sadeghi, S., Maleki, A.: Adaptive canonical correlation analysis for harmonic stimulation frequencies recognition in ssvep-based bcis. Turkish Journal of Electrical Engineering & Computer Sciences 27(5), 3729-3740 (2019).

Zerafa, R., Camilleri, T., Falzon, O., Camilleri, K. P.: To train or not to train? A survey on training of feature extraction methods for ssvep-based bcis. Journal of Neural Engineering 15(5), 051001 (2018).

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A method of automatically authenticating an identification of a user, the method comprising:
    presenting, during a registration phase, via a processor of a computing device, a plurality of stimuli on a display device associated with the computing device to the user for a predetermined amount of time;
    recording, during the registration phase, via a neurological headset communicatively coupled to the processor of the computing device, an electrical activity of a brain of the user, based on a response to each of the plurality of stimuli presented on the display device to generate an electroencephalogram (EEG) dataset of the electrical activity of the brain of the user during the registration phase;

presenting, during a login phase, via a processor of a computing device, a plurality of stimuli on a display device associated with the computing device to the user for a predetermined amount of time;

recording, during the login phase, via a neurological headset communicatively coupled to the processor of the computing device, an electrical activity of a brain of the user, based on a response to each of the plurality of stimuli presented on the display device to generate an EEG dataset of the electrical activity of the brain of the user during the login phase;

computing, during an authentication phase, via the processor of the computing device, a cosine similarity between the EEG dataset of the electrical activity of the brain of the user recorded during the registration phase and the EEG dataset of the electrical activity of the brain of the user recorded during the login phase; and automatically authenticating, during the authentication phase, via the processor of the computing device, the identification of the user by:
based on a determination that the computed cosine similarity exceeds a predetermined threshold value, transmitting a notification indicative of a successful identification of the user to the display device associated with the computing device, logging into an application, or both; and
based on a determination that the computed cosine similarity does not exceed the predetermined threshold value, transmitting a notification indicative of an unsuccessful identification of the user to the display device associated with the computing device, re-presenting the plurality of stimuli for the predetermined amount of time, or both.

2. The method of claim 1, wherein the processor further comprises at least one machine learning algorithm, at least one classifier, or both.

3. The method of claim 2, wherein the EEG dataset recorded during the registration phase and the EEG dataset recorded during the login phase comprise at least one P300 event-related potential, the method further comprising the step of, filtering, via the at least one classifier of the processor, the at least one P300 event-related potential from the EEG datasets.

4. The method of claim 3, wherein the computing device further comprises a memory, wherein the EEG dataset recorded during the registration phase and the EEG dataset recorded during the login phase is inputted into the memory of the computing device.

5. The method of claim 3, wherein the step of computing the cosine similarity between the EEG dataset recorded during the registration phase and the EEG dataset recorded during the login phase further comprises the step of, calculating, via the at least one classifier of the processor, a likelihood of accuracy.

6. The method of claim 2, further comprising the step of inputting, via the processor of the computing device, the filtered P300 event-related potential into at least one predetermined P300 event-related potentials dataset.

7. The method of claim 6, further comprising the step of retraining, via the at least one machine learning algorithm of the processor, the likelihood of accuracy based on at least one of the inputted filtered P300 event-related potential of the user, wherein the predetermined amount of time for presenting the plurality of stimuli is updated.

8. The method of claim 1, further comprising adjusting the predetermined threshold based upon the successful identification or unsuccessful identification of the user.

9. The method of claim 1, further comprising separating the EEG dataset recorded during the registration phase and the EEG dataset recorded during the login phase into alpha, beta and theta bands, and wherein computing the cosine similarity between the EEG dataset recorded during the registration phase and the EEG dataset recorded during the login phase further comprises computing the cosine similarity on each of the alpha, beta and theta bands.

10. The method of claim 1, wherein the plurality of stimuli is presented on the display device as a N×N matrix.

11. The method of claim 1, wherein the step of presenting the plurality of stimuli further comprises the step of, transitioning, via the processor of the computing device, each of the plurality of stimuli between a gray-scale color to an enhanced color scheme at a predetermined rate.

12. An authentication optimization system for automatically authenticating an identification of a user, the authentication optimization system comprising:
a computing device having a processor;
a neurological headset, the neurological headset being communicatively coupled to the processor; and
a non-transitory computer-readable medium operably coupled to the processor, the computer-readable medium having computer-readable instructions stored thereon that, when executed by the processor, cause the authentication optimization system to automatically authenticate an identity of a user by executing instructions comprising:
presenting, during a registration phase, via a processor of a computing device, a plurality of stimuli on a display device associated with the computing device to the user for a predetermined amount of time;
recording, during the registration phase, via a neurological headset communicatively coupled to the processor of the computing device, an electrical activity of a brain of the user, based on a response to each of the plurality of stimuli presented on the display device to generate an EEG dataset of the electrical activity of the brain of the user during the registration phase;
presenting, during a login phase, via a processor of a computing device, a plurality of stimuli on a display device associated with the computing device to the user for a predetermined amount of time;
recording, during the login phase, via a neurological headset communicatively coupled to the processor of the computing device, an electrical activity of a brain of the user, based on a response to each of the plurality of stimuli presented on the display device to generate an EEG dataset of the electrical activity of the brain of the user during the login phase; and
computing, during an authentication phase, via the processor of the computing device, a cosine similarity between the EEG dataset of the electrical activity of the brain of the user recorded during the registration phase and the EEG dataset of the electrical activity of the brain of the user recorded during the login phase; and
automatically authenticating, during the authentication phase, via the processor of the computing device, the identification of the user by:
based on a determination that the computed cosine similarity exceeds a predetermined threshold value, transmitting a notification indicative of a successful identification of the user to the display device associated with the computing device, logging into an application, or both; and based on a determination that the computed cosine similarity does not exceed the predetermined threshold value, transmitting a notification indicative of an unsuccessful identification of the user to the display device associated with the computing device, re-presenting the plurality of stimuli for the predetermined amount of time, or both.

13. The authentication optimization system of claim 12, wherein the processor further comprises at least one machine learning algorithm, at least one classifier or both.

14. The authentication optimization system of claim 13, wherein the EEG dataset recorded during the registration phase and the EEG dataset recorded during the login phase comprise at least one P300 event-related potential, and wherein the executed instructions further comprise the step of, filtering, via the at least one classifier of the processor, the at least one P300 event-related potential from the EEG datasets.

15. The authentication optimization system of claim 14, wherein the computing device further comprises a memory, wherein the EEG dataset recorded during the registration phase and the EEG dataset recorded during the login phase is inputted into the memory of the computing device.

16. The authentication optimization system of claim 14, wherein the executed instructions for computing the cosine similarity between the EEG dataset recorded during the registration phase and the EEG dataset recorded during the login phase further comprises the step of, calculating, via the at least one classifier of the processor, a likelihood of accuracy.

17. The authentication optimization system of claim 13, wherein the executed instructions further comprise the step of inputting, via the processor of the computing device, the filtered P300 event-related potential into at least one predetermined P300 event-related potentials dataset.

18. The authentication optimization system of claim 17, wherein the executed instructions further comprise the step of retraining, via the at least one machine learning algorithm of the processor, the likelihood of accuracy based on at least one of the inputted filtered P300 event-related potential of the user, wherein the predetermined amount of time for presenting the plurality of stimuli is updated.

19. The authentication optimization system of claim 12, wherein the executed instructions further comprise the step of adjusting the predetermined threshold based upon the successful identification or unsuccessful identification of the user.

20. The authentication optimization system of claim 12, wherein the executed instructions further comprises separating the EEG dataset recorded during the registration phase and the EEG dataset recorded during the login phase into alpha, beta and theta bands, and wherein the executed instructions step of computing the cosine similarity between the EEG dataset recorded during the registration phase and the EEG dataset recorded during the login phase further comprises executed instructions for computing the cosine similarity on each of the alpha, beta and theta bands.

* * * * *